United States Patent
Sarkar et al.

(10) Patent No.: US 11,941,010 B2
(45) Date of Patent: Mar. 26, 2024

(54) DYNAMIC FACET RANKING

(71) Applicant: International Business Machines Corporation, Armonk, NY (US)

(72) Inventors: Soumitra Sarkar, Cary, NC (US); Md Faisal Mahbub Chowdhury, Woodside, NY (US); Ruchi Mahindru, Elmsford, NY (US); Gaetano Rossiello, Brooklyn, NY (US); Alfio Massimiliano Gliozzo, Brooklyn, NY (US); Nicolas Rodolfo Fauceglia, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 17/130,556

(22) Filed: Dec. 22, 2020

(65) Prior Publication Data

US 2022/0197916 A1  Jun. 23, 2022

(51) Int. Cl.
*G06F 17/00* (2019.01)
*G06F 7/00* (2006.01)
(Continued)

(52) U.S. Cl.
CPC .. *G06F 16/24578* (2019.01); *G06F 16/24556* (2019.01); *G06F 16/248* (2019.01); *G06F 16/285* (2019.01); *G06N 20/00* (2019.01)

(58) Field of Classification Search
CPC .............. G06F 16/24578; G06F 16/285; G06F 16/24556; G06F 16/248; G06N 20/00
(Continued)

(56) References Cited

U.S. PATENT DOCUMENTS

| 7,137,062 B2 | 11/2006 | Kaufman |
| 7,603,348 B2 | 10/2009 | He |

(Continued)

FOREIGN PATENT DOCUMENTS

| CN | 105550226 A | 5/2016 |
| CN | 107077501 A | 8/2017 |

(Continued)

OTHER PUBLICATIONS

Ali et al., "Entity Attribute Ranking Using Learning to Rank", Proceedings of the First Workshop on Knowledge Graphs and Semantics for Text Retrieval and Analysis (KG4IR), Tokyo, Japan, Aug. 11, 2017, 6 pages.

(Continued)

*Primary Examiner* — Pavan Mamillapalli
(74) *Attorney, Agent, or Firm* — David K. Mattheis

(57) ABSTRACT

Embodiments of the present invention provide a computer system, a computer program product, and a method that comprises analyzing a performed query by identifying a plurality of indicative markers based on a pre-stored classification database associated with the performed query; generating a plurality of facets based on the analysis of the performed query; selecting at least two facets within the generated plurality of facets by determining a quantitative similarity value between each respective facet and the plurality of identified indicative markers associated with the performed query; dynamically ranking the selected facets by prioritizing the selected facets based on a calculated overall score associated with assigned weighted values for each selected facet in the generated plurality of facets using a supervised machine learning algorithm; and displaying the dynamically ranked facets within a user interface of a computing device associated with a user.

20 Claims, 4 Drawing Sheets

(51) Int. Cl.
*G06F 16/2455* (2019.01)
*G06F 16/2457* (2019.01)
*G06F 16/248* (2019.01)
*G06F 16/28* (2019.01)
*G06N 20/00* (2019.01)

(58) Field of Classification Search
USPC .......................................................... 707/728
See application file for complete search history.

(56) References Cited

U.S. PATENT DOCUMENTS

| | | | |
|---|---|---|---|
| 7,730,059 B2 | 6/2010 | Behnen | |
| 8,214,361 B1 | 7/2012 | Sandler | |
| 9,183,288 B2 | 11/2015 | Murray | |
| 9,336,314 B2 | 5/2016 | Lam | |
| 9,372,606 B2 | 6/2016 | Scherpa | |
| 10,242,103 B2 | 3/2019 | Bivens | |
| 10,410,261 B2 | 9/2019 | Siddiqui | |
| 10,482,146 B2* | 11/2019 | Thornton | G06N 20/00 |
| 11,341,169 B2* | 5/2022 | Li | G06N 3/08 |
| 2004/0249796 A1* | 12/2004 | Azzam | G06F 16/24575 |
| 2006/0155728 A1* | 7/2006 | Bosarge | G06F 16/955 |
| | | | 707/E17.112 |
| 2007/0294274 A1* | 12/2007 | Kano | G06F 16/10 |
| 2008/0243778 A1* | 10/2008 | Behnen | G06F 16/248 |
| 2009/0106244 A1 | 4/2009 | Dash | |
| 2009/0265346 A1* | 10/2009 | Kadayam | G06F 16/951 |
| | | | 707/999.005 |
| 2011/0125764 A1 | 5/2011 | Carmel | |
| 2012/0011129 A1* | 1/2012 | van Zwol | G06F 16/951 |
| | | | 707/E17.084 |
| 2013/0339372 A1 | 12/2013 | Adayikkoth | |
| 2016/0063120 A1* | 3/2016 | Ivchenko | G06F 16/3322 |
| | | | 707/728 |
| 2016/0085803 A1* | 3/2016 | Chadha | G06F 16/9535 |
| | | | 707/765 |
| 2017/0154280 A1* | 6/2017 | Adir | G06F 16/285 |
| 2017/0308613 A1* | 10/2017 | Zhu | G06F 16/9535 |
| 2018/0046721 A1* | 2/2018 | Thornton | G06F 16/9535 |
| 2018/0150466 A1 | 5/2018 | Paquet | |
| 2018/0189417 A1* | 7/2018 | Freed | G06F 16/9032 |
| 2018/0268065 A1* | 9/2018 | Parepally | G06N 20/00 |
| 2018/0373791 A1* | 12/2018 | Yen | G09B 7/04 |
| 2019/0073404 A1* | 3/2019 | Klouche | G06F 16/24578 |
| 2019/0138615 A1* | 5/2019 | Huh | G06F 16/93 |
| 2019/0171757 A1* | 6/2019 | Asokan | G06F 16/838 |
| 2019/0354555 A1 | 11/2019 | Freed | |
| 2020/0097531 A1 | 3/2020 | Kajinaga | |

FOREIGN PATENT DOCUMENTS

| | | |
|---|---|---|
| CN | 108431806 A | 8/2018 |
| CN | 109828991 A | 5/2019 |
| CN | 116648698 A | 8/2023 |
| DE | 112021006604 T5 | 10/2023 |
| EP | 3186724 A | 7/2017 |
| WO | 2022134778 A1 | 6/2022 |

OTHER PUBLICATIONS

Bashir et al., "Opinion-Based Entity Ranking using learning to rank", Accepted Oct. 2, 2015, 13 pages, <dx.doi.org/10.1016/j.asoc.2015.10.001>.
Kang et al., "Learning to rank related entities in Web search", Abstract, Oct. 20, 2015, Science Direct, 3 pages, <https://doi.org/10.1016/j.neucom.2015.04.004>.
Manioudakis et al., "Extending Faceted Search with Automated Object Ranking", Oct. 2019, 8 pages.
Van Belle, Agnes, "Learning to Rank for Faceted Search", Berlin Buzzwords 2017, 48 pages.
Zhang et al., "TaxoGen Unsupervised Topic Taxonomy Construction by Adaptive Term Embedding and Clustering", KDD 2018, Aug. 19-23, 2018, London, United Kingdom, 9 pages, <https://doi.org/10.1145/3219819.3220064>.
Kong et al., "Dynamic Faceted Search on a Document Corpus", U.S. Appl. No. 16/399,030, filed Apr. 30, 2019, 29 pages.
Kong et al., "Dynamic Faceted Search on a Document Corpus", U.S. Appl. No. 16/399,180, filed Apr. 30, 2019, 28 pages.
International Search Report and Written Opinion dated Oct. 19, 2021 from International Application No. PCT/CN2021124603 filed Jan. 19, 2022.
"Patents Act 1977: Examination Report Under Section 18(3)", Application No. GB2310365.8, dated Sep. 5, 2023, 6 Pgs.

\* cited by examiner

DYNAMIC FACET RANKING

BACKGROUND

The present invention relates generally to the field of ranking technology, and more specifically dynamic facet ranking technology.

A search filter is a specific product attribute a visitor can use to refine the search results of a particular category listing, e.g., by size, color, price, or brand. Multiple filters may be applied to take a broad range of products and refine them into a narrower selection, allowing the end user to retrieve the most relevant search results based on the criteria selected. Filters are a sophisticated tool to help users find information. Filters analyze a given set of content to exclude items that do not meet certain criteria.

A faceted navigation extends the idea of filters even further into a complex structure that attempts to describe all the different aspects of an object for maximum flexibility in information retrieval. Ideally, faceted navigation provides multiple filters, one for each different aspect of the content. Faceted navigation is more flexible and more useful than systems that provide only one or two different types of filters, especially for extremely large content sets. Faceted navigation describes many different dimensions of the content, provides a structure to help users understand the content space, and provides users with ideas about what is available and how to search for it.

SUMMARY

Embodiments of the present invention provide a computer system, a computer program product, and a method that comprises analyzing a performed query by identifying a plurality of indicative markers based on a pre-stored classification database associated with the performed query; generating a plurality of facets based on the analysis of the performed query, where a generated plurality of facets is a search result; selecting at least two facets within the generated plurality of facets by determining a quantitative similarity value between each respective facet and the plurality of identified indicative markers associated with the performed query; dynamically ranking the selected facets by prioritizing the selected facets based on a calculated overall score associated with assigned weighted values for each selected facet in the generated plurality of facets using a supervised machine learning algorithm; and displaying the dynamically ranked facets within a user interface of a computing device associated with a user.

DETAILED DESCRIPTION

Embodiments of the present invention recognize the need for an improvement to facet generation technology because the generation of facets is manually performed and remains unsupervised. A facet is a classification of data based on a performed query. For example, filters that assist with a query in a database is an example of a facet. Current facet generation technology generates facets for documents manually as annotations or tags prior to document indexing, which increase the amount of time it takes to generate facets and lowers the efficiency of the facet generation technology. Also, current facet generation technology requires manual labor to generate facets, which is an unsupervised task, allowing for unnecessary errors, specifically human error. Generally, facet generation technology has a ranking process that is also unsupervised, which leads to unnecessary errors due to human error. Embodiments of the present invention improve the efficiency of current facet generation technology by dynamically generating facets and dynamically ranking generated facets. Embodiments of the present invention remove the unnecessary errors, specifically human errors, by dynamically generating facets and dynamically ranking generated facets using a supervised machine learning algorithm. Embodiments of the present invention dynamically rank generated facets by receiving data in the form of a performed query; analyzing the received data using a search engine algorithm; generating a plurality of facets based on the analysis of the received data using the search engine algorithm, wherein the generated plurality of facets is defined as a result; dynamically selecting at least two facets within the generated plurality of facets using a facet selection algorithm; dynamically ranking the selected facets within the generated plurality of facets using a supervised machine learning algorithm; and displaying the dynamically ranked facets on a user interface of a computer device.

Figure 1:
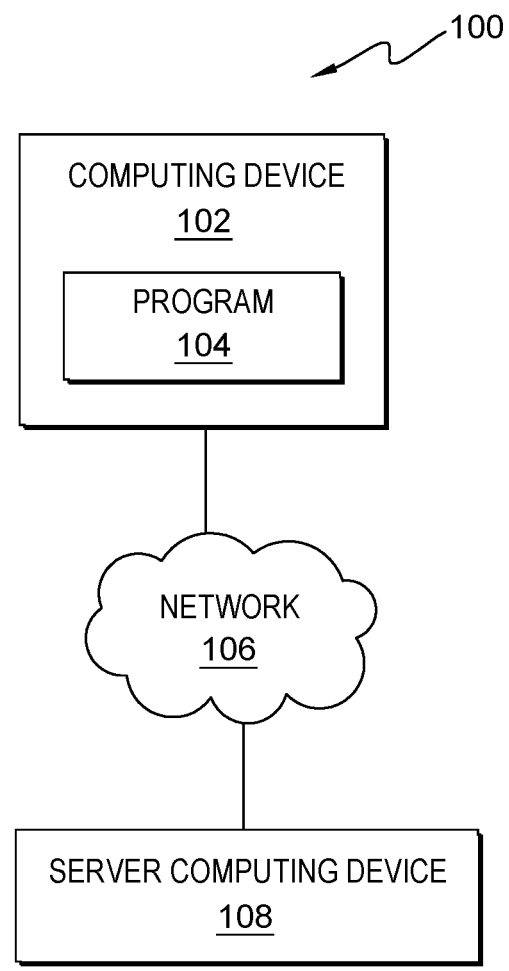
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 4.

The computing device 102 may include a program 104. The program 104 may be a stand-alone program on the computing device 102. In another embodiment, the program 104 may be stored on a server computing device 108. In this embodiment, the program 104 improves the efficiency of facet generation technology by dynamically ranking generated facets using a supervised machine learning algorithm and removes unnecessary errors, specifically human error, by dynamically ranking generated facets associated with performed queries using supervised machine learning algorithms, facet selection algorithms, search engine algorithms and artificial intelligence algorithms. In this embodiment, the program 104 dynamically ranks generated facets by receiving data in the form of a performed query. In this embodiment, the program 104 defines the query as a retrieval of information of a database. Then, the program 104 analyzes the received data by identifying indicative markers associated with the received data using a search engine algorithm. In this embodiment, the program 104 defines the indicative markers as factors that assist with the classification of the received data within the database. In another embodiment, the program 104 defines indicative markers as embedded vectors. Then, the program 104 generates a plurality of facets based on the analysis of the received data using the search engine algorithm, wherein the generated plurality of facets is defined as a result. In this embodiment, the program 104 defines the facet as a dynamic classification or annotation associated with the received data. Then, the program 104 dynamically selects at least two facets within the generated plurality of facets using a facet selection algorithm. In this embodiment, the program 104 dynamically selects at least two facets based on a determined similarity within the plurality of facets. In this embodiment, the program 104 defines dynamic selection as a training of a model associated with the classification of the received data based on the analysis. For example, the program 104 dynamically selects facets based on topic and type classifications respectively. Then, the program 104 dynamically ranks the selected facets within the generated plurality of facets by assigning weighted values to each indicative markers associated with each selected facet, calculating an overall score by summing the assigned weighted values for the plurality of indicative markers, and prioritizing the selected facets based on the calculated overall scores of respective selected facets using a supervised machine learning algorithm. Then, the program 104 displays the dynamically ranked facets on a user interface of a computer device 102. In another embodiment, the program 104 stores the dynamically ranked facets within a server computing device 108 via a network 106.

In another embodiment, the program 104 transmits the received data in the form of the performed query to a search engine module (not shown) to analyze the received data for a plurality of identified indicative markers. In this embodiment, the program 104 transmits instructions to the search engine module to identify indicative markers within the received data using the search engine algorithm.

In another embodiment, the program 104 transmits the generated plurality of facets to a facet selection module (not shown) to dynamically select at least two facets within the generated plurality of facets that meet or an exceed a predetermined threshold of similarity. In this embodiment, the program 104 transmits instructions to the facet selection module to dramatically select at least two facets within the generated plurality of facets based a determined similarity between the at least two facets and the performed query using the facet selection algorithm.

In another embodiment, the program 104 transmits the selected facets within the generated plurality of facets to a facet ranker module (not shown) to dynamically rank the selected facets based on a calculated overall score associated with each respective facet. In this embodiment, the program 104 transmits instructions to the facet ranker module to dynamically rank the selected facets by prioritizing the selected facets based on the calculated overall scores of respective selected facets using a supervised machine learning algorithm.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 communicates with the computing device 102 via the network 106 to store a plurality of generated facets. In another embodiment, the server computing device 108 stores the program 104. In another embodiment, the server computing device 108 stores the database (not shown). The server computing device 108 may be a single computing device, a laptop, a cloud-based collection of computing devices, a collection of servers, and other known computing devices. In this embodiment, the server computing device 108 may be in communication with the computing device 102. In another embodiment, the server computing device 108 may be communication with the program 104. In another embodiment, the program 104 may store a database of performed queries, generated plurality of facets, and ranked facets within the server computing device 108.

Figure 2:
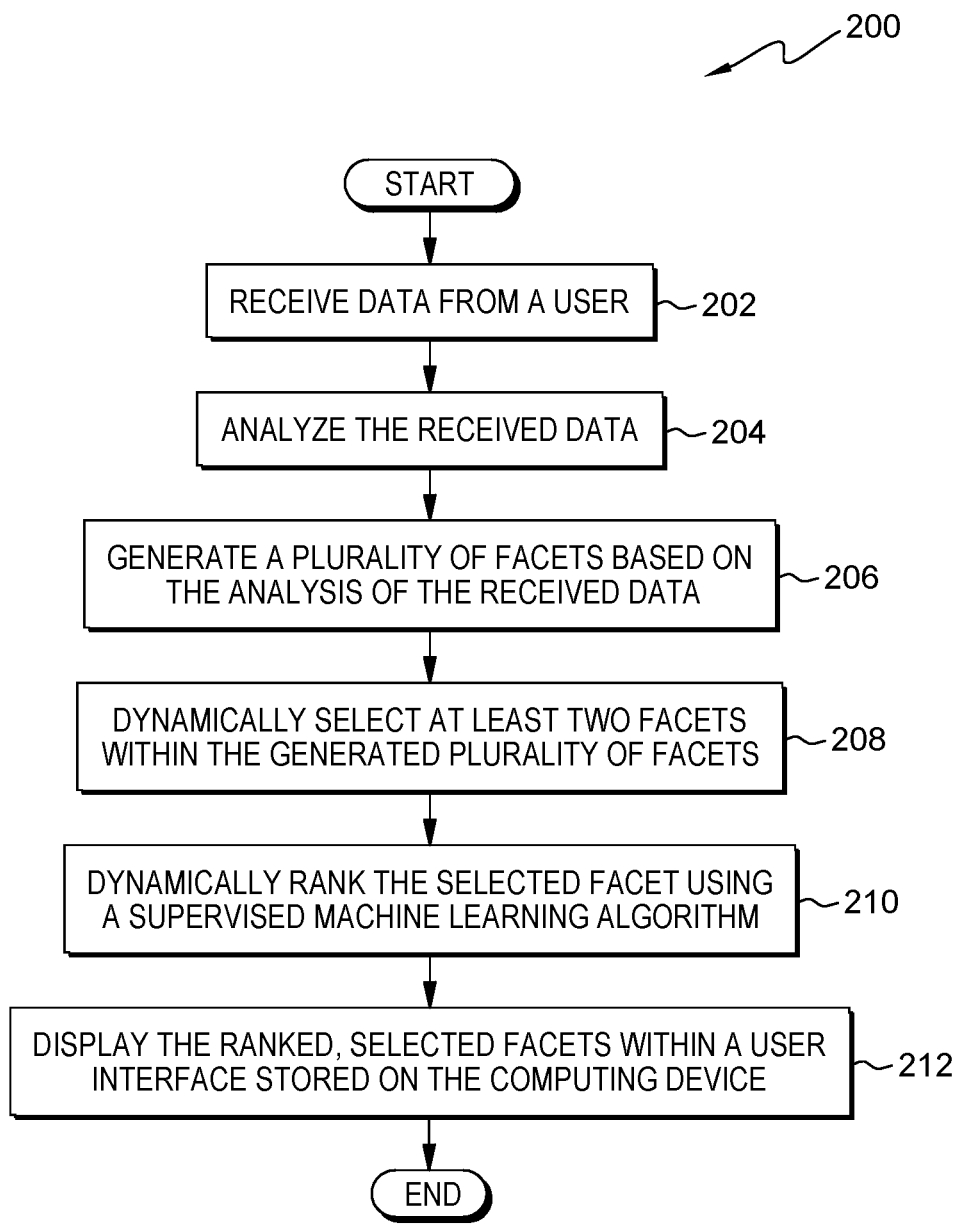
FIG. 2 is a flowchart illustrating operational steps for dynamically ranking facets using a supervised machine learning algorithm, in accordance with at least one embodiment of the present invention.

FIG. 2 is a flowchart 200 illustrating operational steps for dynamically ranking facets using a supervised machine learning algorithm, in accordance with at least one embodiment of the present invention.

In step 202, the program 104 receives data from a user. In this embodiment, the program 104 receives data from a user in the form of a performed query. In this embodiment and in response to receiving data associated with personal information of the user, the program 104 receives opt-in/opt-out permission from the user prior to receiving data associated with the user. For example, the program 104 receives clothing data based on a performed query of a clothing manufacturer database.

In step 204, the program 104 analyzes the received data. In this embodiment, the program 104 analyzes the received data by identifying a plurality of indicative markers associated with the performed query within the received data using a search engine algorithm. In this embodiment, the program 104 defines the indicative markers as classifications of data within the received data. In this embodiment, classifications are defined as information that distinguishes one indicative marker from the remainder of indicative markers within the plurality of indicative markers. For example, the program 104 identifies make, model, and number of seats of an automobile as classifications of an automobile. In another embodiment, the program 104 analyzes the received data by identifying classifications based on the performed query associated with the received data. For example, the program 104 identifies sweaters as an indicative marker within the performed query of the clothing manufacturer database and slacks as another indicative marker within the performed query of the clothing manufacturer database, wherein the identified sweaters and slacks are indicative classifications of clothing. In another example, the program 104 identifies color, make, and model as indicative markers of an automobile.

In step 206, the program 104 generates a plurality of facets based on the analysis of the received data. In this embodiment, the program 104 defines the generated plurality of facets as a result of the performed query associated with the received data. In this embodiment, the program 104 generates the plurality of facets by matching at least one of the identified indicative markers to the performed query associated with received data of the user using the search engine algorithm. For example, the program 104 matches the indicative marker of black within an automotive database the performed query of a black sedan using the search engine algorithm. In this embodiment, the program 104 determines a positive match between at least one facet in the plurality of facets to at least one indicative marker by identifying information requested within the performed search and identifying information associated with the requested information within the result. For example, the program 104 performs a query for sneakers within the clothing manufacturer database and generates a color annotation, a size annotation, a style annotation as the plurality of facets associated with the performed query, wherein each respective facet further classifies the result of the performed query by providing information associated with each generated facet.

In another embodiment, the program 104 generates a plurality of facets associated with each performed query. In this embodiment, the program 104 splits the performed query into key terms, and the program 104 generates a plurality of facets for each key term associated with the performed query. In this embodiment, the program 104 identifies key terms within the performed query by analyzing the performed query for a predetermined set of terms based on a pre-stored database of terms associated with the generated plurality of facets. In this embodiment and in response to identifying the key terms, the program 104 separates the key terms and generates a plurality of facets for each separated key term. For example, the program 104 analyzes the performed query of the user as "Black Sedan," and the program 104 generates a plurality of facets associated with black, which is a key term, automobiles and generates a plurality of facets associated with four-door automobiles, which is another key term. In this example, the color and number of doors are within the predetermined set of terms within the pre-stored database associated with the generated plurality of facets. In another embodiment, the program 104 generates a plurality of facets based on a search of related documents of the performed query performed by the program 104. In this embodiment, the program 104 defines related documents as documents that contain matching topic and type information within the document as the performed query.

In step 208, the program 104 dynamically selects at least two facets within the generated plurality of facets. In this embodiment, the program 104 dynamically selects at least two facets within the generated plurality of facets by determining a quantified similarity between the generated plurality of facets and the analysis of the performed query using a facet selection algorithm. In this embodiment, the program 104 defines this as dynamic because the program 104 selects at least two facets within the generated plurality of facets without human input and constantly changes based on the performed query. In this embodiment, the program 104 determines the quantified similarity by establishing a threshold of similarity associated with the performed query and matching each respective facet with the generated plurality of facets to the plurality of identified indicative markers associated with the performed query. In this embodiment, each positive match is assigned a value of one and each failed match is assigned a value of zero. For example, the positive match of color receives a value of one, a positive match of manufacturer origin receives a value of one, the positive match of sedan receives a value of one, and the failed match of rear-wheel drive receives a value of zero. In this example, the program 104 determines the value associated with the performed query is three based on the aggregation of the values of the positive matches associated with each determined similarity of each facet. In this embodiment and in response to aggregating the assigned values associated with the determined similarity of each facet, the program 104 dynamically selects at least two facets that meet or exceed the predetermined threshold of similarity. In this embodiment, the predetermined threshold of similarity is defined as an aggregated value of two. For example, the program 104 dynamically selects a facet associated with color due to the similarity to the performed query of "black sedan" due to type and topic and a facet associated with texture due to the similarity to the performed query of "wool sock" due to type and topic.

In another embodiment, the program 104 trains a facet select module by determining the quantified similarity within each facet, identifying a plurality of features associated with a search result based on the performed query, wherein the search result is based on the determined similarity within each facet, and dynamically selecting at least two identified features within each facet based on a knowledge graph score using a facet selection algorithm. In this embodiment, the knowledge graph score is defined as an identified feature that has a calculated strength of relation between each identified feature and the determined similarity of each facet. In another embodiment, the knowledge graph score has been induced using techniques that are subject to other disclosures such a dimension reduction technique when the number of identified features and the number of facets are very large. An example of identified features associated with the search result are ratio of document titles containing the facet, ratio of document text containing the facet, Boolean indicating frequency of facet in the title, Boolean indicating frequency of facet in the document text, and minimum index of facet in the text across all the results returned. In this embodiment, the program 104 trains the facet selection module by continually updating the module based on the selected features with a predetermined knowledge graph score.

In step 210, the program 104 dynamically ranks the selected facets using a supervised machine learning algorithm. In this embodiment, the program 104 dynamically ranks the selected facets within the generated plurality of facets by assigning weighted values to each respective indicative marker associated with each facet within the generated plurality of facets, calculating an overall score by summing the assigned weighted values of the plurality of indicative markers for each facet within the generated plurality of facets, and prioritizing the selected facets based on the calculated overall score of each respective facet. In this embodiment, the program 104 defines this as dynamic because the program 104 selects at least two facets within the generated plurality of facets without human input and constantly changes based on the performed query. In this embodiment, the program 104 receives user preferences associated with the plurality of indicative markers, wherein the ranking of the user preferences modifies the assigned weight value of each indicative marker within the plurality of markers. For example, the program 104 assigns a value of one for the type, topic, term, and feature match for facet A and calculates the overall score as four for facet A. In this example, the program 104 assigns a value of one for the type and topic match for facet B and calculates the overall score as two for facet B. In this example, program 104 prioritizes and dynamically ranks facet A in higher order than facet B based on the calculated overall score of facet A being greater than the calculated overall score of facet B. In another example, the program 104 receives a user preference that prioritizes the type facet above the term facet. In this example, the program 104 assigns a weighted value of three for the positive match of the type facet and assigns a weighted value of two for the positive match of the term facet.

In this embodiment, the program 104 assigns weight values to each identified indicative marker associated with each facet by quantifying each indicative marker that matches an identified indicative marker associated with the performed query. In this embodiment, each match is assigned a weighted value of one. In other embodiment and in response to receiving additional information from a user that a specific indicative marker is a higher priority than the remainder of identified indicative markers, then the match of that specific indicative marker is assigned a weighted value greater than one.

In this embodiment and in response to assigning weighted values to the plurality of identified indicative markers, the program 104 calculates the overall score of the selected facets by summing the assigned weighted values of the plurality of indicative markers for each facet within the generated plurality of facets using an artificial intelligence algorithm. In another embodiment, the program 104 calculates an overall score based on a knowledge graph feature associated with a facet rank module that assigns values to a plurality of dimensional vectors associated with the performed query. In this embodiment, the calculated overall score is proportional to a strength of relation between the plurality of indicative markers associated with each facet and the plurality of indicative markers associated with the performed query. In another embodiment, the program 104 defines the strength of relation as the quantified similarity. In this embodiment, a knowledge graph is defined as a collection of interlinked descriptions of entities, objects, events or concepts.

In this embodiment, the program 104 prioritizes the selected facets based on the calculated overall scores of the selected facets. In this embodiment, the program 104 prioritizes the selected facets by placing selected facets with a higher calculated overall score in a higher position than selected facets with a lesser calculated overall score using a supervised machine learning algorithm. In this embodiment, the program 104 defines the supervised machine learning as the machine learning task of learning a function that maps an input to an output based on example input-output pairs and infers a function from labeled training data consisting of a set of training examples. In another embodiment and in response to transmitting the selected facets to a facet ranker module, the program 104 transmits instructions to the facet ranker module to dynamically rank the selected ranker module based on calculated overall scores associated with each respective facet using the supervised machine learning algorithm.

In step 212, the program 104 displays the ranked, selected facets within a user interface stored on the computing device 102. In this embodiment, the program 104 displays the ranked, selected facets within the user interface as display output. In this embodiment, the program 104 defines display output as output on electronic displays, or hardcopy printouts, or other auxiliary displays considered display elements related to performed query associated with the user. For example, the program 104 displays the ranked facets as prompted labels within the clothing manufacturer database that assist the user interact with the database and identify items that meet or exceed the predetermined threshold of similarity to the initial performed query of the user.

Figure 3:
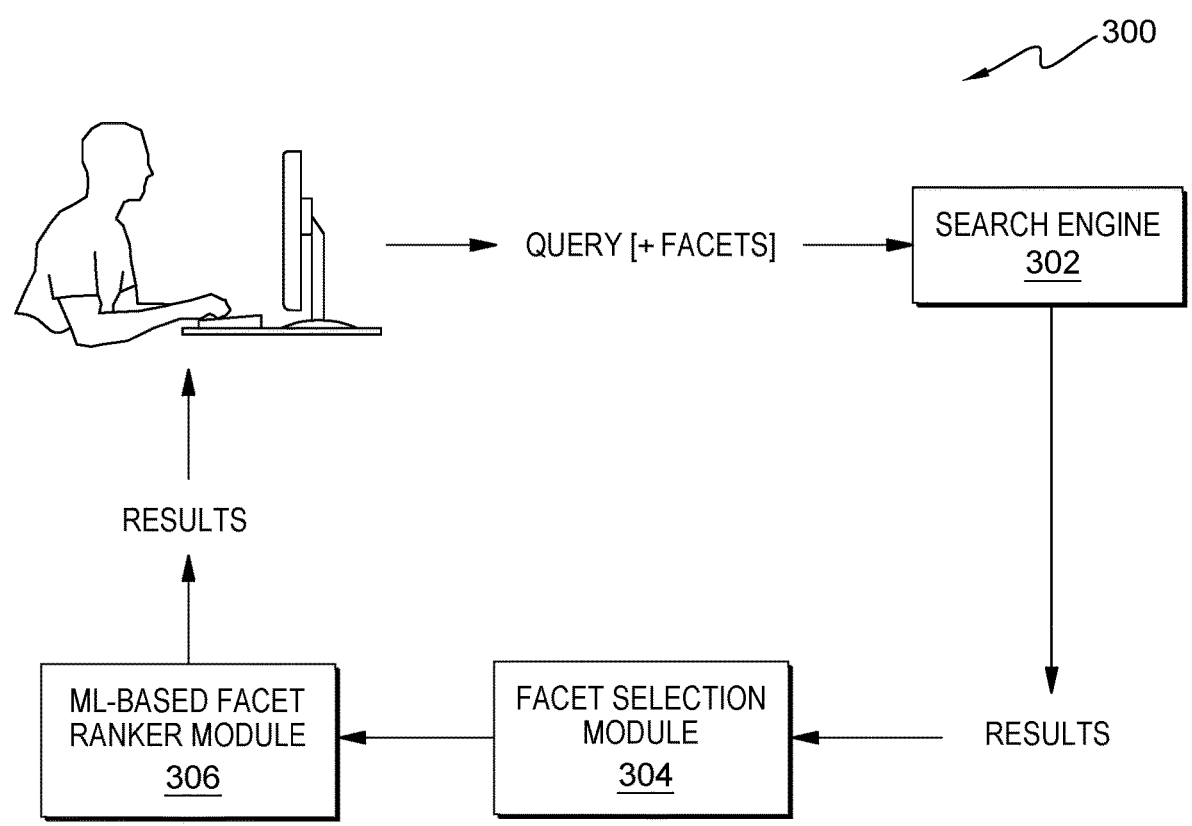
FIG. 3 is an exemplary diagram illustrating the dynamic ranking facets within a query, in accordance with at least one embodiment of the present invention.

FIG. 3 is an exemplary diagram 300 illustrating the dynamic ranking facets within a query, in accordance with at least one embodiment of the present invention. In this embodiment, search engine module 302, facet selection module 304, and facet ranker module 306 are within the program 104. In another embodiment, the program 104 communicates with the search engine module 302, facet selection module 304, and facet ranker module 306 respectively, as described in FIG. 3.

In FIG. 3, search engine module 302 receives instructions from the program 104 to analyze the transmitted data from the user. In this embodiment, the program 104 transmits instructions to the search engine module 302 to identify indicative markers within the transmitted data associated with the user using a search engine algorithm. In this embodiment, the transmitted data is defined as a performed query. In this embodiment, the program 104 generates a plurality of facets based on the analysis of the transmitted data by the search engine module 302. Then, the program 104 transmits instructions to a facet selection module 304 to select at least two facets from the generated plurality of facets. In this embodiment, the program 104 transmits instructions to the facet selection module 304 to dynamically select at least two facets by determining a quantified similarity of the plurality of identified indicative markers associated with each facet to the plurality of identified indicative markers associated with the performed query using a facet selection algorithm. Then, the program 104 transmits instructions to a facet ranker module 306 to dynamically rank the selected facets. In this embodiment, the program 104 transmits instructions to the facet ranker module 306 to dynamically rank the selected facets within the generated plurality of facets by prioritizing the selected facets based on the calculated overall score associated with each facet within the generated plurality of facets using the supervised machine learning algorithm. Then, the program 104 displays the dynamically ranked facets within a user interface on the computing device 102.

Figure 4:
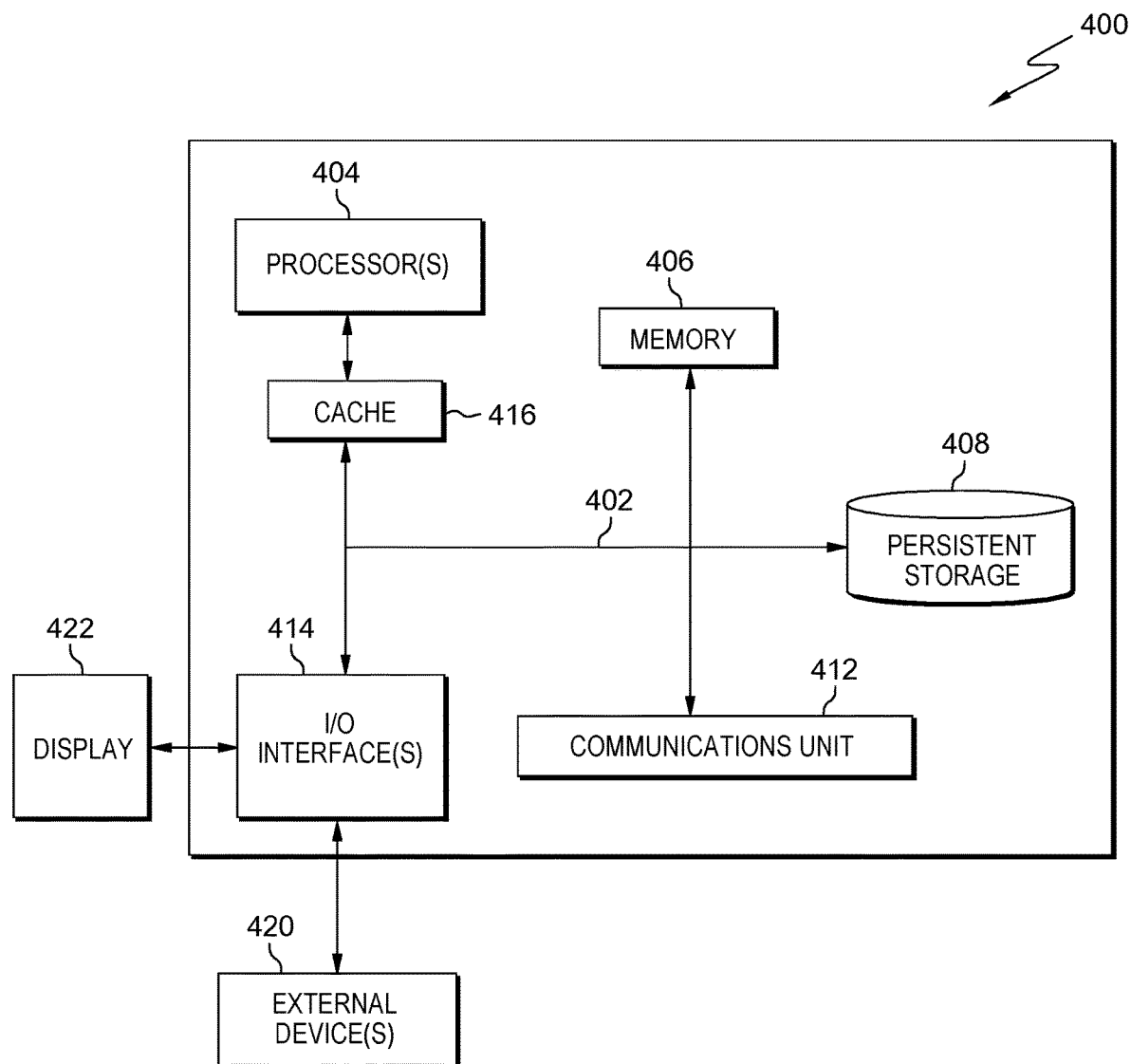
FIG. 4 depicts a block diagram of components of computing systems within a computing display environment of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 412, and an input/output (I/O) interface(s) 414. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. The program 104 may be downloaded to the persistent storage 408 through the communications unit 412.

The I/O interface(s) 414 allows for input and output of data with other devices that may be connected to a mobile device, an approval device, and/or the server computing device 108. For example, the I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 414. The I/O interface(s) 414 also connect to a display 422.

The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   analyzing a performed query by identifying a plurality of indicative markers based on a pre-stored classification database associated with data received for the performed query;
   generating a plurality of facets based on the analysis of the performed query, wherein a generated plurality of facets is a search result;
   defining the plurality of indicative markers as embedded vectors;
   selecting at least two facets within the generated plurality of facets by determining a quantitative similarity value between a plurality of indicative markers associated with each respective facet and the plurality of indicative markers associated with the performed query;
   dynamically ranking the selected facets by prioritizing the selected facets based on a calculated overall score associated with assigned weighted values for each selected facet in the generated plurality of facets using a supervised machine learning algorithm; and
   displaying the dynamically ranked facets within a user interface of a computing device associated with a user.

2. The computer-implemented method of claim 1, wherein generating the plurality of facets comprises matching at least one of the identified indicative markers to the performed query associated with received data of a user.

3. The computer-implemented method of claim 2, wherein matching the at least one identified indicative marker to the performed query comprises identifying information requested within the performed query and information associated with the requested information within the result that are a positive match.

4. The computer-implemented method of claim 1, further comprising:
   separating the analysis of the performed query into key terms by identifying a plurality of terms within the analysis of the performed query;
   placing a plurality of identified terms into a separate database from a remainder of identified terms; and
   generating a plurality of facets for each identified term placed within the separated database associated with the analysis of the performed query.

5. The computer-implemented method of claim 1, wherein selecting at least two facets within the generated plurality of facets comprises:
   determining a quantified similarity between the generated plurality of facets and the analysis of the performed query by calculating a knowledge graph score based on an aggregation of positive matches associated with a plurality of identified features;
   establishing a predetermined threshold of similarity associated with the determined similarity; and
   dynamically selecting at least two facets that meet or exceed the predetermined threshold of similarity based on the calculated knowledge graph score associated within an identified feature of each facet.

6. The computer-implemented method of claim 1, wherein dynamically ranking the selected facets comprises:
   assigning weighted values to each respective indicative marker associated with each facet within the generated plurality of facets;
   calculating an overall score by summing the assigned weighted values of the plurality of indicative markers for each facet within the generated plurality of facets; and
   prioritizing the selected facets based on the calculated overall score of each respective facet.

7. The computer-implemented method of claim 6, wherein prioritizing the selected facets comprises placing selected facets with a higher calculated overall score in a higher position than the selected facets with a lesser calculated overall score using the supervised machine learning algorithm.

8. A computer program product comprising:
   one or more computer readable storage media and program instructions stored on the one or more computer readable storage media, the program instructions comprising:
   program instructions to analyze a performed query by defining a plurality of indicative markers as embedded vectors and identifying the plurality of indicative markers based on a pre-stored classification database associated with data received for the performed query;
program instructions to generate a plurality of facets based on the analysis of the performed query, wherein a generated plurality of facets is a search result;
program instructions to select at least two facets within the generated plurality of facets by determining a quantitative similarity value between a second plurality of indicative markers associated with each respective facet and the plurality of indicative markers associated with the performed query;
program instructions to dynamically rank the selected facets by prioritizing the selected facets based on a calculated overall score associated with assigned weighted values for each selected facet in the generated plurality of facets using a supervised machine learning algorithm; and
program instructions to display the dynamically ranked facets within a user interface of a computing device associated with a user.

9. The computer program product of claim 8, wherein the program instructions to generate the plurality of facets comprise program instructions to match at least one of the identified indicative markers to the performed query associated with received data of a user.

10. The computer program product of claim 9, wherein the program instructions to match the at least one identified indicative marker to the performed query comprise program instructions to identify information requested within the performed query and information associated with the requested information within the result that are a positive match.

11. The computer program product of claim 8, wherein the program instructions stored on the one or more computer readable storage media further comprise:
program instructions to separate the analysis of the performed query into key terms by identifying a plurality of terms within the analysis of the performed query;
program instructions to place a plurality of identified terms into a separate database from a remainder of identified terms; and
program instructions to generate a plurality of facets for each identified term placed within the separated database associated with the analysis of the performed query.

12. The computer program product of claim 8, wherein the program instructions to select at least two facets within the generated plurality of facets comprise:
program instructions to determine a quantified similarity between the generated plurality of facets and the analysis of the performed query by calculating a knowledge graph score based on an aggregation of positive matches associated with a plurality of identified features;
program instructions to establish a predetermined threshold of similarity associated with the determined similarity; and
program instructions to dynamically select at least two facets that meet or exceed the predetermined threshold of similarity based on the calculated knowledge graph score associated within tan identified feature of each facet.

13. The computer program product of claim 8, wherein the program instructions to dynamically rank the selected facets comprise:

program instructions to assign weighted values to each respective indicative marker associated with each facet within the generated plurality of facets;
program instructions to calculate an overall score by summing the assigned weighted values of the plurality of indicative markers for each facet within the generated plurality of facets; and
program instructions to prioritize the selected facets based on the calculated overall score of each respective facet.

14. The computer program product of claim 13, wherein the program instructions to prioritize the selected facets comprise program instructions to place selected facets with a higher calculated overall score in a higher position than the selected facets with a lesser calculated overall score using the supervised machine learning algorithm.

15. A computer system comprising:
one or more computer processors;
one or more computer readable storage media; and
program instructions stored on the one or more computer readable storage media for execution by at least one of the one or more processors, the program instructions comprising:
program instructions to analyze a performed query by defining a plurality of indicative markers as embedded vectors and identifying the plurality of indicative markers based on a pre-stored classification database associated with data received for the performed query;
program instructions to generate a plurality of facets based on the analysis of the performed query, wherein a generated plurality of facets is a search result;
program instructions to select at least two facets within the generated plurality of facets by determining a quantitative similarity value between a second plurality of indicative markers associated with each respective facet and the plurality of indicative markers associated with the performed query;
program instructions to dynamically rank the selected facets by prioritizing the selected facets based on a calculated overall score associated with assigned weighted values for each selected facet in the generated plurality of facets using a supervised machine learning algorithm; and
program instructions to display the dynamically ranked facets within a user interface of a computing device associated with a user.

16. The computer system of claim 15, wherein the program instructions to generate the plurality of facets comprise program instructions to match at least one of the identified indicative markers to the performed query associated with received data of a user.

17. The computer system of claim 16, wherein the program instructions to match the at least one identified indicative marker to the performed query comprise program instructions to identify information requested within the performed query and information associated with the requested information within the result that are a positive match.

18. The computer system of claim 15, wherein the program instructions stored on the one or more computer readable storage media further comprise:
program instructions to separate the analysis of the performed query into key terms by identifying a plurality of terms within the analysis of the performed query;

program instructions to place a plurality of identified terms into a separate database from a remainder of identified terms; and program instructions to generate a plurality of facets for each identified term placed within the separated database associated with the analysis of the performed query.

19. The computer system of claim 15, wherein the program instructions to select at least two facets within the generated plurality of facets comprise:

program instructions to determine a quantified similarity between the generated plurality of facets and the analysis of the performed query by calculating a knowledge graph score based on an aggregation of positive matches associated with a plurality of identified features;

program instructions to establish a predetermined threshold of similarity associated with the determined similarity; and program instructions to dynamically select at least two facets that meet or exceed the predetermined threshold of similarity based on the calculated knowledge graph score associated within an identified feature of each facet.

20. The computer system of claim 15, wherein the program instructions to wherein the program instructions to dynamically rank the selected facets comprise:

program instructions to assign weighted values to each respective indicative marker associated with each facet within the generated plurality of facets;

program instructions to calculate an overall score by summing the assigned weighted values of the plurality of indicative markers for each facet within the generated plurality of facets; and program instructions to prioritize the selected facets based on the calculated overall score of each respective facet.

* * * * *